United States Patent [19]

Dalton et al.

[11] Patent Number: 5,624,332
[45] Date of Patent: Apr. 29, 1997

[54] GOLF BALL CORE PATCHING METHOD

[75] Inventors: Jeffrey L. Dalton, North Dartmouth; Robert J. Cotter, Mattapoisett, both of Mass.

[73] Assignee: Acushnet Company, Fairhaven, Mass.

[21] Appl. No.: 482,523

[22] Filed: Jun. 7, 1995

[51] Int. Cl.[6] ................................................. A63B 37/08
[52] U.S. Cl. ........................... 473/354; 156/273.3; 29/899
[58] Field of Search ................................ 473/354, 368, 473/369; 273/231; 29/899; 156/273.3

[56] References Cited

U.S. PATENT DOCUMENTS

| | | | |
|---|---|---|---|
| 2,074,808 | 3/1937 | Rickey | 473/354 |
| 3,437,512 | 4/1969 | Burlant et al. | 117/93.31 |
| 3,437,513 | 4/1969 | Burlant et al. | 117/93.31 |
| 3,437,514 | 4/1969 | Burlant | 117/93.31 |
| 3,509,234 | 4/1970 | Burlant et al. | 260/859 |
| 3,528,844 | 9/1970 | Burlant et al. | 117/93.31 |
| 3,542,586 | 11/1970 | Aronoff et al. | 117/93.31 |
| 3,542,587 | 11/1970 | Aronoff et al. | 117/93.31 |
| 3,577,262 | 5/1971 | Nordstrom | 117/93.31 |
| 3,577,263 | 5/1971 | Nordstrom | 117/93.31 |
| 3,577,264 | 5/1971 | Nordstrom | 117/93.31 |
| 3,577,265 | 5/1971 | Nordstrom | 117/93.31 |
| 3,585,065 | 6/1971 | Johnson | 117/93.31 |
| 3,586,527 | 6/1971 | Aronoff et al. | 117/93.31 |
| 3,586,528 | 6/1971 | Labana et al. | 117/93.31 |
| 3,586,529 | 6/1971 | Aronoff et al. | 117/93.31 |
| 3,586,530 | 6/1971 | Aronoff et al. | 117/93.31 |
| 3,616,101 | 10/1971 | Satchell et al. | 473/354 X |
| 3,641,210 | 2/1972 | Fellers et al. | 260/885 |
| 3,642,939 | 2/1972 | Fellers et al. | 260/836 |
| 3,649,337 | 3/1972 | Johnson et al. | 117/93.31 |
| 3,650,811 | 3/1972 | Nordstrom et al. | 117/93.31 |
| 3,650,812 | 3/1972 | Nordstrom et al. | 117/93.31 |
| 3,650,813 | 3/1972 | Nordstrom et al. | 117/93.31 |
| 3,660,143 | 5/1972 | Johnson et al. | 117/93.31 |
| 3,660,144 | 5/1972 | Johnson et al. | 117/93.31 |
| 3,660,145 | 5/1972 | Johnson et al. | 117/93.31 |
| 3,660,471 | 5/1972 | Sawano et al. | 260/513 R |

Primary Examiner—George J. Marlo
Attorney, Agent, or Firm—Pennie & Edmonds

[57] ABSTRACT

A method of producing a sealed, liquid filled spherical object for use in a golf ball core comprising the steps of;

(a) providing a hollow spherical object;

(b) injecting a flowable material into said spherical object wherein said injecting produces an aperture in said spherical object;

(c) sealing said aperture with a radiation curable polymer; and (d) exposing said radiation curable polymer to radiation in an amount and for a time sufficient to cure said polymer.

10 Claims, 1 Drawing Sheet

GOLF BALL CORE PATCHING METHOD

FIELD OF THE INVENTION

The present invention is directed to golf ball made up of a plurality of components including a cover and a core wherein said core comprises a liquid filled center having an aperture which is sealed with a radiation curable polymer.

BACKGROUND OF THE INVENTION

Most golf balls fall into one of several general types of ball construction. Two piece balls comprise a solid core and a cover. Three piece or wound balls traditionally comprise a solid or liquid filled center wound with an elastic thread and covered with another material, usually trans polyisoprene or an ionomer. Recently, the term "three piece" has also been used in reference to golf balls having a center inside of a solid mantle of a polybutadiene having a compression different than the compression of the center.

Golf balls having a liquid filled center have been known for many years. Liquid centers are used extensively in three piece balls. Liquid centers have been traditionally made by incorporating a small amount of water between two sheets of natural rubber and then making round punches having sealed edges from the two sheets of rubber. Afterward, these circular punches are put in spherical mold cavities, and heated, whereupon the water in the punch expands forcing the rubber material against the hot walls of the mold. Hollow spheres so produced are filled with a solution of liquid by piercing the hollow rubber sphere with a needle syringe and then injecting the liquid into the center. The needle syringe, however, produces a puncture hole in the ball which must be sealed to prevent leakage of the liquid filling material.

In the past this puncture hole has been sealed with a two-component polyurethane adhesive. Although two-component urethanes have proven effective for sealing the puncture hole, these urethanes tend to generate undesirable volatile organic compounds ("VOC"). Also, such two-component urethanes tend to crack when applied to flexible surfaces. Two-component urethanes, moreover, tend to be slow curing, typically requiring more than about one hour to cure at room temperature.

There is therefore a need in the golf ball art for a solution to the problem of sealing the injection hole in liquid filled golf ball centers which overcomes the disadvantages of the prior art.

SUMMARY OF THE INVENTION

The present invention is directed to a method and a product which overcome the disadvantages of prior art golf ball centers by applying radiation curable resins onto the puncture holes produced by the needle syringe employed to fill the hollow rubber cores, and then curing those resins with radiation, preferably ultraviolet light radiation.

This present invention is also directed to a method of producing a sealed, liquid filled spherical object for use in a golf ball core comprising the steps of; (a) providing a hollow spherical object; (b) injecting a flowable material into said spherical object wherein said injecting produces an aperture in said spherical object; and, (c) sealing said hole with a radiation curable polymer.

Further, the subject invention is directed to a spherical object for use in a golf ball core comprising a spherical shell wherein said shell contains an aperture and said aperture is covered with a radiation cured polymer and said shell is filled with a flowable material.

Additionally, the present invention is directed to a golf ball comprising a cover and a core wherein said core comprises a liquid filled center having an aperture which is sealed with a radiation cured polymer.

DETAILED DESCRIPTION OF THE INVENTION

Figure 1:
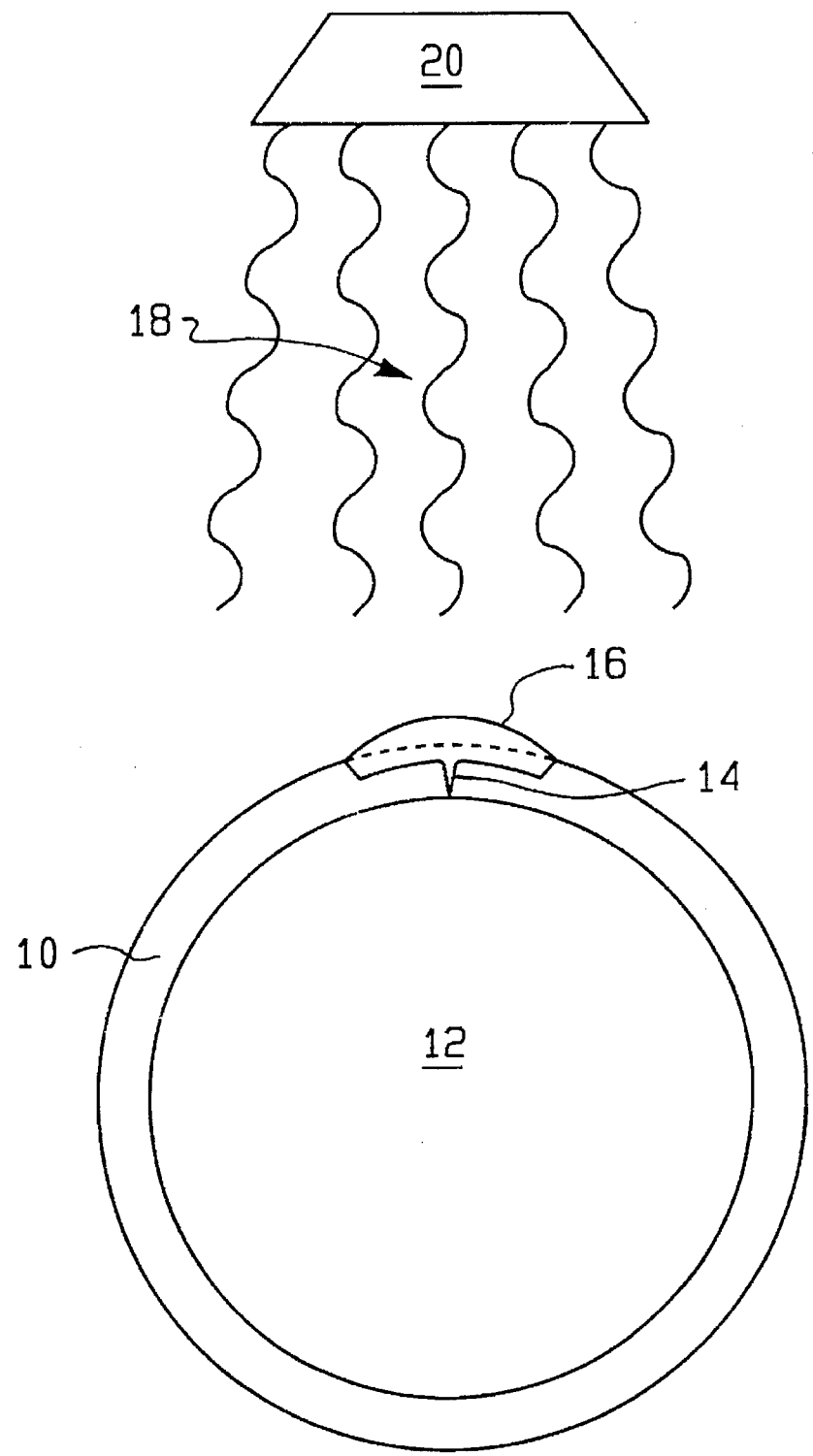
FIG. 1 illustrates a cross section of a liquid filled spherical object in which the aperture is sealed with the method of the invention.

For purposes of the present invention the term "three piece ball" refers to a golf ball having a center whose outer surface is smaller than the inside surface of the golf ball cover, and wherein the area between the outer surface of the center and the inner surface of the cover is filled with a compound and/or composition having different properties than the compound/composition of the center.

The term aperture is herein defined as meaning a hole or a passage way between the exterior and interior of the spherical core.

The present invention is directed to the use of radiation curable polymers to seal the injection hole in a liquid filled golf ball center. According to the present invention a sealing effective amount of a radiation curable polymer is added to the surface of a liquid filled sphere to cover the injection aperture through which the liquid was added to the interior of the sphere. Then, at least the portion of the sphere which is covered with the radiation curable polymer is exposed to radiation in an amount, and for a time, sufficient to cure said polymer. The sphere can then be used in golf ball cores according to techniques well known to the person of ordinary skill in the golf ball art.

The radiation curable polymer can be applied using any method for consistently dispensing uniform amounts of material. Such means can be a pipette or an automatic air powered dispensing unit such as, for example, any of the custom Accu-Quip accurate adhesive dispensing apparatus from Perma-Bond Inc., Englewood, N.J.

A preferred embodiment of the invention is illustrated in FIG. 1. In the process of filling hollow spherical object 10 with flowable material 12, an aperture 14 is formed. To prevent leakage of the flowable material, aperture 14 is first covered with radiation curable polymer 16 by adding a sealing effective amount of the radiation curable polymer 16 to the surface of the liquid filled spherical object 10. Then, at least the portion of the spherical object 10 covered with the radiation curable polymer 16 is exposed to radiation 18 from source 20 in an amount and for a time sufficient to cure the polymer.

The amount of radiation cured polymer can be any amount that is effective to seal the liquid in the center and be effective for use in a golf ball core. This amount can vary from about 0.001 milligrams to about 15 grams. Preferably, the amount of polymer will be from about 0.01 grams to about 3 grams. Most preferably the amount of radiation cured polymer will be from about 0.1 grams to about 2 grams.

The resins for use in the present invention include any radiation cured polymer including those that can be cured using radiation from sources such as electron beam, plasma arc, ultra violet light ("UV"), x-ray, natural sunlight, and the like. These types of radiation are well known to the skilled artisan and exemplary forms of such radiation, including the wavelength, intensity and time duration for curing specific polymers are described, for example, in U.S. Pat. No. 3,586,530, issued Jun. 22, 1971, and U.S. Pat. No. 3,437,514 issued Apr. 8, 1969.

The resins which can be used in the present invention include organic polymers falling into the following general categories of compounds: vinyl containing polymers such as those described in U.S. Pat. No. 3,586,528, issued on Jun. 22, 1971, U.S. Pat. No. 3,586,527, issued Jun. 22, 1971, U.S. Pat. No. 3,586,529, issued Jun. 22, 1971, U.S. Pat. No. 3,509,234, issued Apr. 28, 1970, U.S. Pat. No. 3,642,939, issued Jun. 22, 1971, U.S. Pat. No. 3,437,513, issued Apr. 8, 1969, silicone containing polymers such as those set forth in U.S. Pat. No. 3,437,512, issued Apr. 8, 1969, U.S. Pat. No. 3,585,065, issued Jun. 15, 1971, U.S. Pat. No. 3,577,263, issued May 4, 1971, U.S. Pat. No. 3,650,813, issued Mar. 21, 1972, and acrylate containing polymers such as those described in U.S. Pat. No. 3,660,145, issued May 2, 1972.

The radiation curable polymers according to the present invention can be chosen from among acrylates such as alkyl acrylates, hydroxyl alkyl acrylates, hydroxyl alkyl acrylates, hydroxy acrylates, methacrylates, silicone containing compounds such as siloxane, vinyl caprolactams such as vinyl pyrrolidone, vinyl ethers, vinyl ether esters such as vinyl ether maleate, vinyl ether acrylates, vinyl ether silicones, urethane acrylates, urethane methacrylates, epoxy acrylates, epoxy silicones, styrenes, ethers, allylic alcohols, epoxies, allylic glycidyl ethers, acyl halides and isocyanates. Particularly, preferred compounds and classes of compounds include styrene, vinyl toluene, alpha-methyl styrene, divinyl benzene, methyl methacrylate, ethyl acrylate, butyl acrylate, hydroxy propyl-methacrylate, an isocyanate, acyl chloride, polyglycidyl methacrylate, monohydroxyl alkyl ester, and hydroxyl bearing esters of an alpha-beta olefinically unsaturated carboxylic acid, urethanes, amides, nitriles, alkenes, and isocyanates.

Acrylates useful in the invention are commercially available under the tradename Permabond 7084-98C UV, from Permabond Co. of Bridgewater, N.J. and may be obtained by known processes.

The adhesive materials employed in the invention to seal a puncture hole in a hollow rubber core have sufficient flexibility for use in golf ball applications.

Any cure time can be used in the present invention which is sufficient to cure the radiation curable polymers of the present invention to a degree sufficient to provide a secure seal to the golf ball center. Preferable curing times are in the range of from less than 0.1 second to more than 15 minutes. The more preferred cure times are between from about less than 0.1 second to about five minutes. The most preferred cure times are from about 0.1 second to about 1 minute.

Three piece balls which employ filled hollow, rubber cores and which are sealed in accordance with the invention are made in a conventional manner by molding cover stock formed around a wound, liquid filled hollow rubber ball. Molding can be accomplished by injection molding cover stock around the wound core or by compression molding preformed half-shells of cover stock around the wound core or by casting polyurethane around the wound core. The preferred method is compression molding.

In compression molding, half-shells of cover stock are made by using well known compression or injection molding techniques to form the cover stock into a conventional half-shell mold heated to about 200° F.–450° F. The preformed half-shells are compression molded around the wound core at about 220° F.–350° F. for about 3 minutes to provide a three-piece ball having a cover thereon. Useful cover compositions include balata, ionomers such as SURLYN compounds from DuPont and polyurethanes.

The resulting molded balls are cooled in the mold and removed therefrom when the cover is hard enough to be handled without deforming. After the balls have been molded, they undergo conventional finishing operations such as buffing, painting and stamping.

Without further elaboration, it is believed that one skilled in the art can, using the preceding description, utilize the present invention to its fullest extent, the following preferred specific embodiments are, therefore, to be construed as merely illustrative, and not limitative of the remainder of the disclosure in any way whatsoever. In the following examples, all temperatures are set forth in decrees Celsius; unless otherwise indicated, all parts and percentages are by weight.

EXAMPLES

In order to exemplify the results achieved using the radiation curable polymers of the present invention, the following examples are provided without any intent to limit the scope of the instant invention to the discussion therein. All parts are percentages by weight and all temperatures are in degrees Celsius unless otherwise indicated.

EXAMPLES 1–6

Two sets of six hollow rubber balls measuring 1⅛ inches in diameter are filled with an aqueous solution of a mixture comprising 15% corn syrup, 15% sodium sulfate, and 70% water. The hollow balls are filled by puncturing them with a syringe that has a needle diameter of 0.065 inches, and injecting the aqueous solution into the hollow ball until it is filled. The first set of six balls (control group) is patched according to the prior art method by applying 0.001 inches thick of moisture curable urethane composition consisting of 90% CHEMGLAZE white coating base Z202, 5% CHEMGLAZE 9951 thinner, 4% CHEMGLAZE 9983 catalyst and 1% CHEMGLAZE 9971 wetting agent all available from Lord Chemical Products of Erie, Pa. The applied urethane is dried for one hour at ambient conditions.

The second set of six balls, after having been filled with the same aqueous solution used for the control balls described above, is patched with the UV curable urethane adhesive Permabond 7084-98C, manufactured by Permabond Co. of Bridgewater, N.J. The puncture holes produced by the syringe are patched by applying a 0.001 inch thick coating of Permabond 7084-98C resin over the puncture hole under ambient conditions.

The resin is cured by exposing it to UV radiation of 3750 angstroms at an intensity of 200 W/cm2 for a period of 1 second. The radiation is generated from a F300 bulb from Fusion Systems.

Both sets of filled hollow rubber balls cores identically are wound with elastic thread using conventional procedures as are known in the art to provide wound cores. Half-shells of balata cover material then are identically compression molded around the wound cores using conventional procedures known in the art. The resulting three piece balls are buffed, cured and painted using techniques known in the art. Each group of balls then is subjected to a crush test to determine the strength of the patch.

The crush test is performed by placing the ball in a hydraulic press. Pressure is applied by the press to the ball until the core ruptures, as indicated by a loud "pop" noise.

The gauge pressure on the press is taken as the measure of the crush strength. The results are given below in Table 1.

TABLE 1

| TEST NO./ CRUSH STRENGTH | CONTROL GROUP | INVENTION | % INCREASE |
| --- | --- | --- | --- |
| 1 | 5370 LB | 5864 LB | 9% |
| 2 | 5145 | 5560 | 8% |

Balls produced in accordance with the prior art method and the invention also were subjected to a multiple hit durability test to determine the durability of the sealing patch under extreme use conditions. In the multiple hit durability test, two groups of twelve balls are evaluated. The first group is produced in accordance with the prior art method described above (Control group). The second set of twelve balls is produced in accordance with the invention also are produced. Each ball in each group is hit using a uniform force 200 times by a high impact rotating pendulum test apparatus.

Thereafter, the balls are sectioned to inspect the integrity of the patch. An additional multiple hit durability test is performed in an identical manner except that the balls are aged for one week at 110° F. The results are given in Table 2.

TABLE 2

| TEST NO. | CONTROL | INVENTION |
| --- | --- | --- |
| 1 | 2 FAILURES | NO FAILURES |
| 2* | 2 FAILURES | NO FAILURES |

*Balls aged for one week at 110° F.

All patents, patent applications and printed publications discussed in the text above, are herein specifically incorporated by reference in their entirety.

Other aspects of the invention will be apparent to those skilled in the art from consideration of the specification, or from practice of the invention disclosed herein. It is intended that the specification and examples be considered as exemplary only, with the scope and spirit of the invention being indicated by the following claims. The scope of the following claims is intended to encompass all obvious changes in the details, materials, and arrangement of parts that will occur to one of ordinary skill in the art.

We claim:

1. A method of producing a sealed, liquid filled spherical object for use in a golf ball core comprising the steps of;
   (a) providing a hollow spherical object;
   (b) injecting a flowable material into said spherical object wherein said injecting produces an aperture in said spherical object;
   (c) sealing said aperture with a radiation curable polymer; and
   (d) exposing said radiation curable polymer to radiation in an amount and for a time sufficient to cure said polymer.

2. The method of claim 1 wherein said spherical object is a hollow rubber ball.

3. The method of claim 1 wherein said flowable material is a composition comprising corn syrup, sodium sulfate and water.

4. The method of claim 1 wherein said radiation curable polymer is ultra-violet light curable.

5. The method of claim 1 wherein said radiation curable polymer is electron beam curable.

6. The method of claim 4 wherein said radiation curable polymer is a urethane acrylate.

7. The method of claim 6 wherein said ultraviolet light has an intensity of about 200 W/cm$^2$ and a wavelength of about 375 nm.

8. The method of claim 7 wherein said resin is treated with ultraviolet light for a period of less than about 2 minutes.

9. The method according to claim 1 which further comprises selecting the radiation curable polymer from the group consisting of styrenes, acrylates, alkyl acrylates, hydroxyl alkyl acrylates, vinyl caprolactams, vinyl ether acrylates, urethane acrylates, urethane methacrylates, epoxy acrylates, epoxy silicones, siloxanes, ethers, allylic alcohols, epoxies, allylic glycidyl ethers, acyl halides and isocyanates.

10. The method according to claim 1 which further comprises selecting the radiation curable polymer from the group consisting of styrene, vinyl toluene, alpha-methyl styrene, divinyl benzene, methyl methacrylate, ethyl acrylate, butyl acrylate, hydroxy propyl-methacrylate, an isocyanate, acyl chloride, polyglycidyl methacrylate, monohydroxyl alkyl ester and hydroxyl bearing esters of alpha-beta olefinically unsaturated carboxylic acids, urethanes, amides, nitriles, alkenes, or isocyanates.

* * * * *